United States Patent
Iwasaki

(10) Patent No.: US 9,717,988 B2
(45) Date of Patent: Aug. 1, 2017

(54) RENDERING SYSTEM, RENDERING SERVER, CONTROL METHOD THEREOF, PROGRAM, AND RECORDING MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 368 days.

(21) Appl. No.: 14/355,914

(22) PCT Filed: Oct. 31, 2012

(86) PCT No.: PCT/JP2012/078767
§ 371 (c)(1),
(2) Date: May 2, 2014

(87) PCT Pub. No.: WO2013/069654
PCT Pub. Date: May 16, 2013

(65) Prior Publication Data
US 2014/0302930 A1    Oct. 9, 2014

Related U.S. Application Data

(60) Provisional application No. 61/556,375, filed on Nov. 7, 2011.

(30) Foreign Application Priority Data

Sep. 7, 2012  (JP) ................................. 2012-197875

(51) Int. Cl.
*A63F 13/355* (2014.01)
*A63F 13/30* (2014.01)
*G06T 15/00* (2011.01)

(52) U.S. Cl.
CPC ............ *A63F 13/355* (2014.09); *A63F 13/12* (2013.01); *G06T 15/00* (2013.01); *G06T 15/005* (2013.01);
(Continued)

(58) Field of Classification Search
CPC ...................................................... G06T 17/00
See application file for complete search history.

(56) References Cited

U.S. PATENT DOCUMENTS 5,572,636 A   11/1996   Sakuraba et al.
5,586,234 A   12/1996   Sakuraba et al.
(Continued)

FOREIGN PATENT DOCUMENTS

CN    101038736    9/2007
CN    102724532    10/2012
(Continued)

OTHER PUBLICATIONS

Search report from International Preliminary Report on Patentability from PCT/JP2012/078767, mail date is Mar. 19, 2013.
(Continued)

*Primary Examiner* — Milap Shah
*Assistant Examiner* — Jeffrey Wong
(74) *Attorney, Agent, or Firm* — Greenblum & Bernstein, P.L.C.

(57) ABSTRACT

Rendering processing of a screen to be displayed is divided and performed between a first device and a second device. The first device generates a first screen, on which some rendering objects of rendering objects to be rendered on the screen to be displayed are rendered, based on information for determining rendered contents of the screen to be displayed. The second device generates a second screen on which rendering objects, excepting the some rendering objects from the rendering objects to be rendered on the (Continued)

screen to be displayed, are rendered. The first device receives the second screen from the second device, and generates the screen to be displayed by compositing the first and second screens.

20 Claims, 7 Drawing Sheets

(52) U.S. Cl.
CPC ..... *A63F 2300/538* (2013.01); *G06T 2210/08* (2013.01)

(56) References Cited

U.S. PATENT DOCUMENTS

| | | | |
|---|---|---|---|
| 5,815,156 | A | 9/1998 | Takeuchi |
| 5,850,224 | A | 12/1998 | Sakuraba |
| 5,940,091 | A | 8/1999 | Nakamura |
| 6,052,126 | A | 4/2000 | Sakuraba et al. |
| 6,377,257 | B1 * | 4/2002 | Borrel ................. G06T 15/005 345/419 |
| 7,724,255 | B2 | 5/2010 | Imagire |
| 2002/0080141 | A1 | 6/2002 | Imai et al. |
| 2005/0264566 | A1 | 12/2005 | Sommers |
| 2005/0264567 | A1 | 12/2005 | Sommers |
| 2005/0264576 | A1 | 12/2005 | Sommers |
| 2006/0214949 | A1 | 9/2006 | Zhang |
| 2007/0115280 | A1 | 5/2007 | Imagire |
| 2008/0194320 | A1 * | 8/2008 | Walsh ................ G07F 17/3211 463/25 |
| 2009/0244064 | A1 * | 10/2009 | Inokuchi ................ A63F 13/10 345/420 |
| 2013/0064465 | A1 * | 3/2013 | Tin ........................... G06T 5/50 382/248 |

FOREIGN PATENT DOCUMENTS

| | | |
|---|---|---|
| JP | 6-83977 | 3/1994 |
| JP | 6-214555 | 8/1994 |
| JP | 08-069545 | 3/1996 |
| JP | 8-98089 | 4/1996 |
| JP | 2000-217075 | 8/2000 |
| JP | 2002-109564 | 4/2002 |
| JP | 3533717 B2 | 5/2004 |
| JP | 2005-284403 | 10/2005 |
| JP | 2006-107337 | 4/2006 |
| JP | 2007-141077 | 6/2007 |
| JP | 2008-500636 | 1/2008 |
| JP | 2008-500637 | 1/2008 |
| JP | 2008-501189 | 1/2008 |
| JP | 4566120 B2 | 10/2010 |
| JP | 4733116 B2 | 7/2011 |
| WO | 2005/119597 | 12/2005 |
| WO | 2005/119598 | 12/2005 |
| WO | 2005/119643 | 12/2005 |
| WO | 2009/138878 | 11/2009 |
| WO | 2011/101904 | 8/2011 |

OTHER PUBLICATIONS

Search report from International Patent Appl. No. PCT/JP2012/078767, mail date is Dec. 11, 2012.
Search Report issued by E.P.O. patent office in E.P.O. Patent Application No. 12847394.9, dated Aug. 24, 2015.
Office Action issued in Japan family member Patent Appl. No. 2012-197875, dated Nov. 7, 2016 , along with an English translation thereof.
Office Action issued in Chinese family member Patent Appl. No. 201280054294.5, dated Nov. 3, 2015, along with an English translation thereof.
Office Action issued in Japan family member Patent Appl. No. 2012-197875, dated Nov. 7, 2016, along with an English translation thereof.

* cited by examiner

| TEXTURE ID | FIELD WHERE CAMERA IS LOCATED | CONTENT-BASED TIME ZONE | TEXTURE STORAGE LOCATION |
|---|---|---|---|
| 1 | FIELD A | MORNING | STORAGE LOCATION A |
| 2 | | DAYTIME | STORAGE LOCATION B |
| 3 | | NIGHT | STORAGE LOCATION C |
| 4 | FIELD B | MORNING | STORAGE LOCATION D |
| 5 | | DAYTIME | STORAGE LOCATION E |
| 6 | | NIGHT | STORAGE LOCATION F |
| 7 | FIELD C | – | STORAGE LOCATION G |

RENDERING SYSTEM, RENDERING SERVER, CONTROL METHOD THEREOF, PROGRAM, AND RECORDING MEDIUM

CLAIM FOR PRIORITY

This application is a U.S. National Stage of PCT/JP2012/078767 Oct. 31, 2012, and claims the priority benefit of U.S. provisional application 61/556,375, filed Nov. 7, 2011, and Japanese application 2012-197875 filed on Sep. 7, 2012, the contents of which is expressly incorporated by reference herein in its entirety.

TECHNICAL FIELD

The present invention relates to a rendering system, rendering server, control method thereof, program, and recording medium, and particularly to a technique for generating one screen by sharing rendering processing between a plurality of devices connected via a network.

BACKGROUND ART

Client devices such as personal computers (PCs) capable of network connection have become widespread. Along with the widespread use of the devices, the network population of the Internet is increasing. Various services using the Internet have recently been developed for the network users, and there are also provided entertainment services such as games.

One of the services for the network users is a multiuser online network game such as MMORPG (Massively Multiplayer Online Role-Playing Game). In the multiuser online network game, a user connects his/her client device in use to a server that provides the game, thereby doing match-up play or team play with another user who uses another client device connected to the server.

In a general multiuser online network game, each client device sends/receives data necessary for game rendering to/from the server. The client device performs rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to perform rendering processing require a user to use a PC having sufficient rendering performance or a dedicated game machine. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in International Publication No. 2009/138878, a server acquires the information of an operation caused in a client device and provides, to the client device, a game screen obtained by performing rendering processing using the information.

International Publication No. 2009/138878 described above describes that a server renders a game screen to be provided to a client device, and transfers the rendered game screen to the client device. That is, the client device can display the game screen by receiving and playing back the game screen generated by rendering processing performed in the server. However, no practical method of sharing the rendering processing between a plurality of devices has been disclosed so far.

SUMMARY OF INVENTION

The present invention has been made in consideration of the aforementioned conventional problems. The present invention provides a rendering system, rendering server, control method thereof, program, and recording medium, which efficiently perform rendering processing for one screen by sharing the rendering processing between a plurality of devices.

The present invention in its first aspect provides a rendering system which divides and performs rendering processing of a screen to be displayed on display means between a first device and a second device, the first device comprising: first rendering means for generating a first screen, on which some rendering objects of rendering objects to be rendered on the screen to be displayed are rendered, based on information for determining rendered contents of the screen to be displayed; screen reception means for receiving a second screen which is generated by the second device and on which rendering objects, excepting the some rendering objects from the rendering objects to be rendered on the screen to be displayed, are rendered; and composition means for generating the screen to be displayed by compositing the first screen generated by the first rendering means and the second screen received by the screen reception means, and the second device comprising: second rendering means for generating the second screen based on the information for determining the rendered contents; and screen transmission means for transmitting the second screen generated by the second rendering means to the first device.

The present invention in its second aspect provides a rendering server for rendering some rendering objects of rendering objects to be rendered on a screen to be displayed on display means connected to a client device, the server comprising: rendering means for generating a providing screen on which the some rendering objects are rendered based on information required to determine rendered contents of the screen to be displayed; and transmission means for transmitting the providing screen generated by the rendering means to the client device.

Further features of the present invention will become apparent from the following description of exemplary embodiments with reference to the attached drawings.

DESCRIPTION OF EMBODIMENTS

Exemplary embodiments of the present invention will be described in detail hereinafter with reference to the drawings. Note that one embodiment to be described hereinafter will explain an example in which the present invention is applied to a PC 100 and a rendering server 200, as an example of a rendering system. In this embodiment, rendering processing of a screen associated with a game program executed by the rendering server 200 is divided between the PC 100 and the rendering server 200 in units of rendering objects which are included in the screen. However, the present invention is applicable to arbitrary devices and a system which can perform rendering processing associated with one screen while dividing the rendering processing between a plurality of devices.

Configuration of Rendering System

Figure 1:
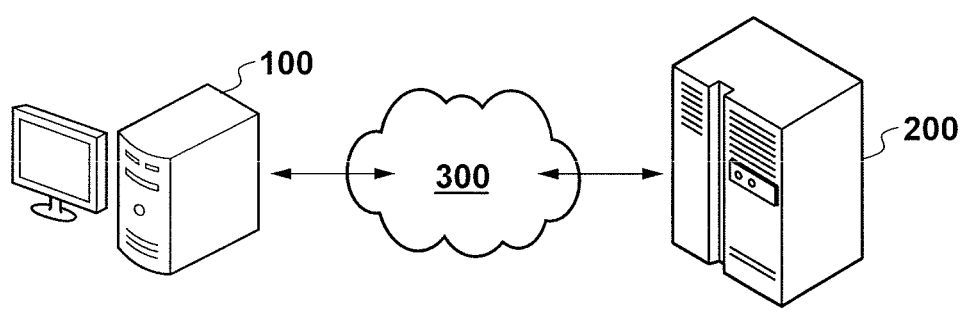
FIG. 1 is a view showing the system configuration of a rendering system according to an embodiment of the present invention.

FIG. 1 shows the system configuration of a rendering system according to an embodiment of the present invention.

As shown in FIG. 1, the PC 100 and the rendering server 200 are connected via a network 300 such as the Internet. In this embodiment, in a game program executed by the rendering server 200, rendering processing related to a screen associated with the game program (game screen) is processed while being divided between the PC 100 and the rendering server 200.

More specifically, for one screen, the PC 100 receives information required to determine the rendered contents of the screen from the rendering server 200 via the network 300, and generates a first screen on which a background object, corresponding to a background of a scene, of rendering objects included in the screen is rendered.

In rendering processing for a three-dimensional scene such as a game screen, rendering objects (for example, mountains, clouds, etc.) of a landscape and the like distant from a camera (viewpoint) are not always rendered by applying textures to individual three-dimensional models. In practice, these rendering objects are prepared as, for example, a texture of two-dimensional image, and are presented. This is for the purpose of reducing a computation amount of the rendering processing. Further this is result from the low necessity of use of three-dimensional models since distant objects are hardly three-dimensionally recognized. That is, a background such as a distant landscape in the rendering processing can be expressed by applying only a texture of a background to a simple three-dimensional model. Hence, the rendering processing for a background object does not require high rendering performance. That is, rendering of a background object can be performed by a GPU having general rendering performance which is able to render a simple three-dimensional model. For this reason, in the rendering system of this embodiment, rendering of a background object is assigned to the PC 100 having a GPU of lower rendering performance than that of the rendering server 200.

The rendering server 200 generates a second screen on which rendering objects (foreground objects) other than the background object of those included in the screen are rendered, and transmits the generated second screen to the PC 100 via the network 300. Then, the PC 100 generates a game screen to be displayed by compositing the received second screen and the generated first screen, and outputs the generated game screen to a connected display device.

As described above, in the rendering system of this embodiment, for the rendering processing of one screen, rendering objects included in the screen are sorted to background objects and foreground objects, and the rendering processing for each of them is divided between two devices (the PC 100 and the rendering server 200). Screens rendered by the respective devices are composited and then a screen, on which all rendering object are rendered, is finally generated.

Note that, in this embodiment, the PC 100 is described as a client device connected to the rendering server 200, but the present invention is not limited to such specific embodiment. For example, the client device connected to the rendering server 200 is a device having rendering processing capability such as a home game machine, portable game machine, mobile phone, PDA, tablet.

Arrangement of PC 100

Figure 2:
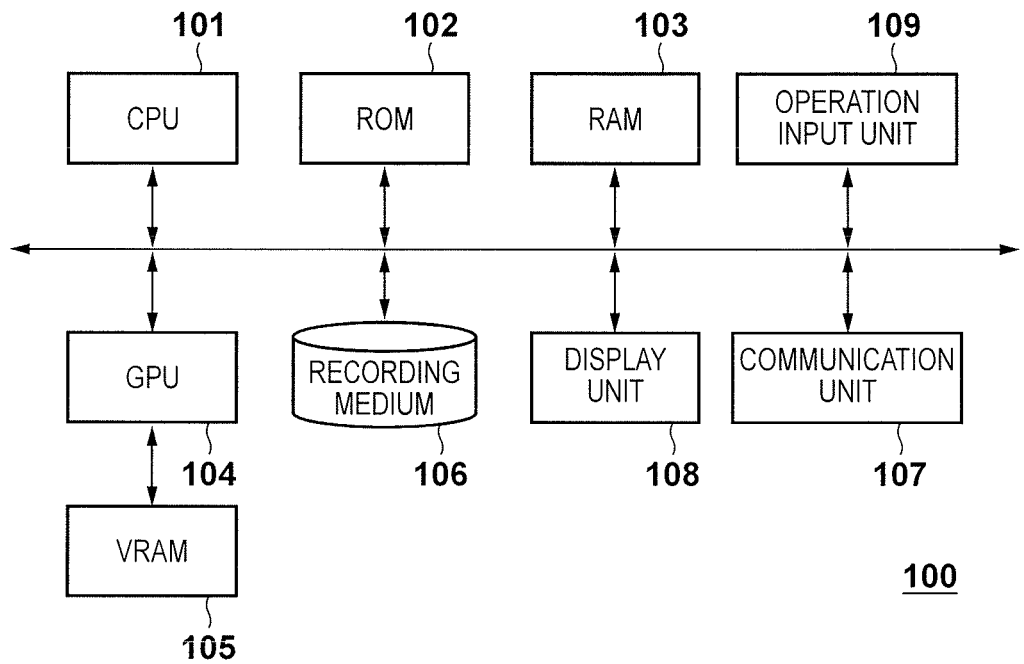
FIG. 2 is a block diagram showing the functional arrangement of a PC 100 according to the embodiment of the present invention.

FIG. 2 is a block diagram showing the functional arrangement of the PC 100 according to the embodiment of the present invention.

A CPU 101 controls the operations of respective blocks included in the PC 100. More specifically, the CPU 101 controls the operations of the respective blocks by reading out an operation programs of screen generation processing or the like, which is recorded in, for example, a ROM 102 or recording medium 106, extracting the readout program onto a RAM 103, and executing the extracted program.

The ROM 102 is, for example, a rewritable nonvolatile memory. The ROM 102 stores information such as constants required for the operations of the respective blocks in addition to operation programs of the respective blocks included in the PC 100.

The RAM 103 is a volatile memory. The RAM 103 is used not only as an extraction area of the operation program, but also as a storage area used to temporarily store intermediate data, which are output during the operations of the respective blocks included in the PC 100, and the like.

A GPU 104 generates a game screen to be displayed on a display unit 108 (to be described later). To the GPU 104, a video memory (VRAM) 105 is connected as a rendering area of the game screen. Also, the GPU 104 has a GPU memory (not shown). Upon reception of a rendering instruction from the CPU 101, the GPU 104 acquires data of a rendering object associated with that rendering instruction, and stores the acquired data in the GPU memory. Then, the GPU 104 renders the rendering object on the connected VRAM 105 according to the rendering instruction. In this embodiment, the GPU 104 generates a first screen on which only a background object of rendering objects, included in the game screen to be displayed, is rendered.

The recording medium 106 is, for example, a recording device such as an HDD or SSD, which is removably connected to the PC 100. In this embodiment, assume that the recording medium 106 records received model data (or vertex data and wire connection data) of rendering objects to be rendered on the game screen from the rendering server 200, in addition to the operation programs of the screen generation processing or the like. In this embodiment, the PC 100 renders a background object of rendering objects included in the game screen to be displayed. In this embodiment, the background object is rendered by applying a distant-view texture to a celestial sphere model. For this reason, the recording medium 106 of this embodiment records the celestial sphere model which is received from the rendering server 200 and is used in the rendering processing of the background object.

Note that the following description of this embodiment will be given under the assumption that the celestial sphere model used in rendering of the background object is distributed from the rendering server 200 to the PC 100. However, the present invention is not limited to this. That is, data of the celestial sphere model used in rendering of the background object may be recorded in the PC 100 in advance, or may be generated for each frame using a primitive set in the rendering processing in the PC 100. The following description will be given under the assumption that the background object is rendered by applying the background texture to the celestial sphere model. However, a model other than the celestial sphere model may be used as a model to which the background texture is applied.

A communication unit 107 is a communication interface included in the PC 100. The communication unit 107 performs data communication with another device connected via the network 300, such as the rendering server 200. When the PC 100 transmits data, the communication unit 107 converts the data into a data transmission format specified between itself and the network 300 or a transmission destination device, and transmits data to the transmission destination device. Also, when the PC 100 receives data, the communication unit 107 converts the data received via the network 300 into an arbitrary data format which can be read by the PC 100, and stores the converted data in, for example, the RAM 103.

Note that the following description of this embodiment will be given under the assumption that the PC 100 and rendering server 200 are connected via the network 300. However, as is easily anticipated, for example, the PC 100 and rendering server 200 may be directly connected using a cable. Alternatively, the PC 100 and rendering server 200 may be connected via another device.

The display unit 108 is, for example, a display device such as an LCD monitor, which is connected to the PC 100. The display unit 108 display controls for displaying the input game screen on a display area. Note that the display unit 108 may be a display device built in the PC 100 like a laptop PC or may be a display device externally connected to the PC 100 using a cable.

An operation input unit 109 is, for example, a user interface such as a mouse, keyboard, and game pad included in the PC 100. When the operation input unit 109 detects that the user has made an operation on the user interface, it outputs a control signal corresponding to that operation to the CPU 101.

Arrangement of Rendering Server 200

Figure 3:
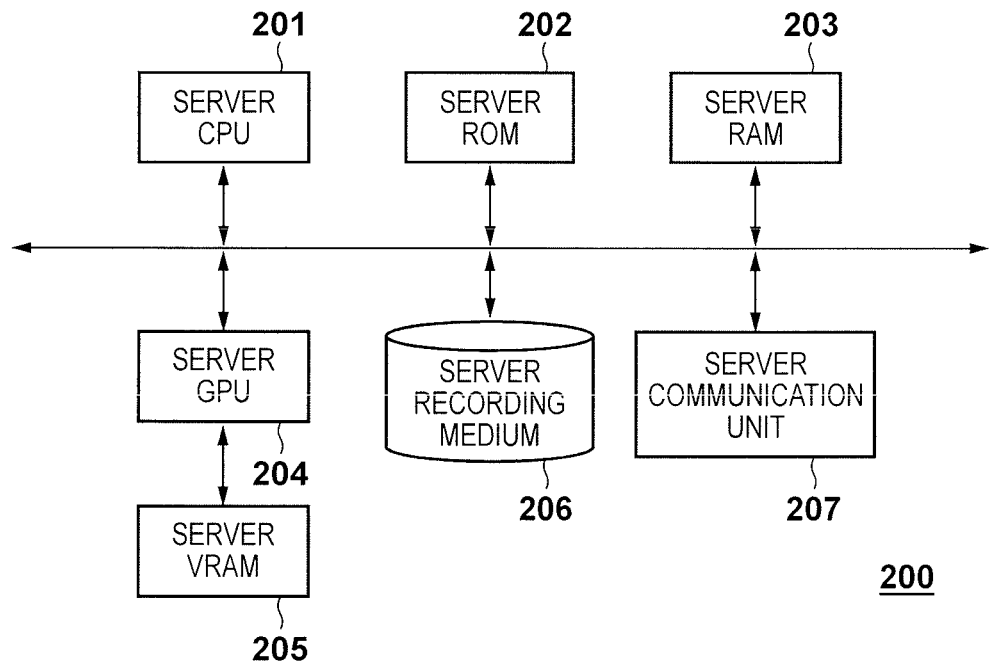
FIG. 3 is a block diagram showing the functional arrangement of a rendering server 200 according to the embodiment of the present invention.

FIG. 3 is a block diagram showing the functional arrangement of the rendering server 200 according to the embodiment of the present invention.

A server CPU 201 controls the operations of respective blocks included in the rendering server 200. More specifically, the server CPU 201 controls the operations of the respective blocks by reading out operation programs of game processing and server-side rendering processing, which are recorded in, for example, a server ROM 202 or server recording medium 206, extracting the readout programs onto a server RAM 203, and executing the extracted programs.

The server ROM 202 is, for example, a rewritable, nonvolatile memory. The server ROM 202 stores information such as constants required for the operations of the respective blocks included in the rendering server 200 in addition to the operation programs of the server-side rendering processing and the like.

The server RAM 203 is a volatile memory. The server RAM 203 is used not only as an extraction area of the operation programs, but also as a storage area used to temporarily store intermediate data, which are output during the operations of the respective blocks included in the rendering server 200, and the like.

A server GPU 204 generates a screen (second screen), on which rendering objects other than the background object of those included in the game screen are rendered, in association with the game screen to be displayed on the display unit 108 of the PC 100. A server VRAM 205 is connected to the server GPU 204. Upon reception of a rendering instruction from the server CPU 201, the server GPU 204 receives data of rendering objects associated with that rendering instruction, and stores the acquired data in a GPU memory. When the server GPU 204 performs rendering on the connected server VRAM 205, it extracts the rendering object on the GPU memory, and writes the extracted rendering object on the server VRAM 205.

The server recording medium 206 is, for example, a recording device such as an HDD, which is removably connected to the rendering server 200. In this embodiment, assume that the server recording medium 206 records model data, light source information, and the like used to generate the screen in the rendering processing. Note that the model data recorded in the server recording medium 206 are the same as those recorded in the recording medium 106 of the PC 100.

A server communication unit 207 is a communication interface included in the rendering server 200. In this embodiment, the server communication unit 207 performs data communication with another device connected via the network 300, such as the PC 100. Note that the server communication unit 207 performs data format conversion according to the communication specifications as in the communication unit 107.

Game Processing

Figure 4:
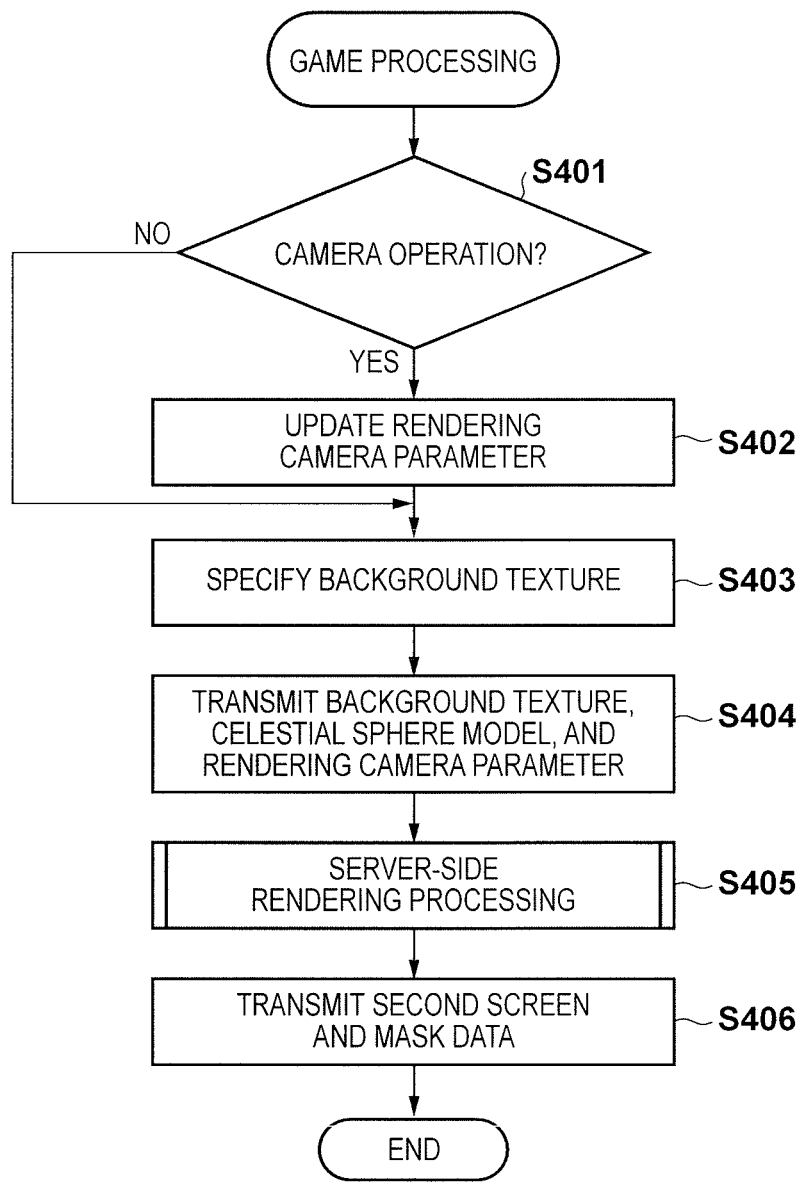
FIG. 4 is a flowchart exemplifying game processing performed by the rendering server 200 according to the embodiment of the present invention.

Basic game processing performed on the rendering server 200, having the aforementioned arrangement, of the rendering system of this embodiment will be described in detail below with reference to the flowchart shown in FIG. 4. The processing corresponding to this flowchart can be implemented when the server CPU 201 reads out a corresponding processing program recorded in, for example, the server ROM 202, extracts the readout program onto the server RAM 203, and executes the extracted program. Note that the following description will be given under the assumption that this game processing is started, for example, when an application corresponding to a game content provided by the rendering server 200 is performed on the PC 100, and the user logs in to the rendering server 200. This game processing is repetitively performed for each frame of the game.

Note that the game content provided by the rendering server 200 of this embodiment provides a game screen by rendering a three-dimensional scene using information (camera parameters) indicating a position and direction of a camera corresponding to the game screen. Assume that rendering objects included in three-dimensional scene associated with the game content of this embodiment can be classified into a background object and foreground objects. Also, assume that the background object can be rendered by applying a background texture to a simple three-dimensional model, as described above.

The server CPU 201 determines in step S401 whether or not the position and direction of the camera, which specify the game screen, have been changed. More specifically, the server CPU 201 determines whether or not the server communication unit 207 receives information of an operation input to change the position and direction of the camera, the input being made on the PC 100. If the server CPU 201 determines that the position and direction of the camera have been changed, the server CPU 201 proceeds the process to step S402; otherwise, the server CPU 201 proceeds the process to step S403.

In step S402, the server CPU 201 updates information (rendering camera parameters) indicating the position and direction of the camera, which is stored in, for example, the server RAM 203, based on the received information of the operation input to change the position and direction of the camera.

In step S403, the server CPU 201 specifies a background texture of the game screen to be rendered. As described above, in the rendering system of this embodiment, rendering processes respectively for the background object and foreground objects are respectively divided and performed between the PC 100 and the rendering server 200. Of these rendering processes, since the PC 100 is assigned to perform the rendering process of the background object, the server CPU 201 specifies, in this step, a background texture used in rendering of the background object in the PC 100.

Background Texture and Background Model

The relationship between the background texture and background model used in rendering of the background object, which is performed on the PC 100 of the rendering system of this embodiment, will be described below with reference to the drawings.

Figure 7:
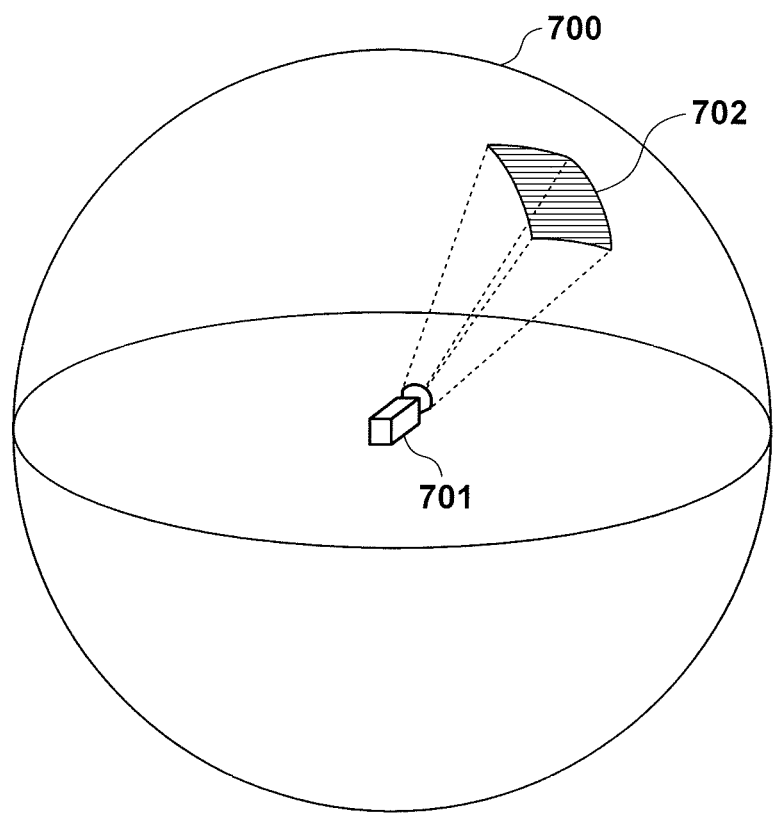
FIG. 7 is a view for explaining the relationship between a background texture and background model in association with rendering of a background object according to the embodiment of the present invention.

As described above, in rendering processing of a three-dimensional scene, a background is generally rendered as a background object by applying a background texture to a simple model. Although models (background models), to each of which the background texture is to be applied, have various shapes, in this embodiment, a celestial sphere model 700, centering on a position of a camera 701 being a viewpoint, is used, as shown in FIG. 7. The background texture applied to the celestial sphere model is a texture which expresses a whole circumference through 360°. For example, when the camera position is determined based on the position and direction of a character to be operated, the texture includes a full background around the character to be operated. Thus, when the direction of the camera is determined, an image 702 corresponding to a region of the whole circumference background texture according to this direction is rendered on the screen as a background. In this case, landscape images and the like included in the background texture are distorted according to the radius of the celestial sphere such that it is accurately expresses, for example, silhouettes of buildings and ridge lines of mountains when viewed from the camera located at the center of the celestial sphere model.

Note that since the whole circumference background texture is applied to the celestial sphere model centering on the camera, when only the rotation of the camera occurs, the CPU 101 need not update the background texture. Also, when a distant view is expressed represented as a background, the CPU 101 need not update the background texture even it changes the position and direction of the camera in correspondence with a motion of the character to be operated. That is, since the moving distance of the camera is very small with respect to a distance from the camera to a position expressed as the background, the CPU 101 need not update the background texture so as to express no change in vision of the background. In fact, while the camera position is included in a specific field, the same background texture can always be applied to the background object.

On the other hand, the background texture is changed in the following case. For example, when an elapse of time is expressed in the game content, the background texture can be changed according to, for example, a time zone (morning, daytime, night, etc; for example, if one hour of an actual time is allocated as one day in the content, the time zone is respectively assigned each time period which is defined by equally dividing one hour of an actual time into three) expressed in the content. Also, when the camera is moved between fields for which landscapes to be expressed (for example, from mountain to forest) change, the background content may be changed. Furthermore, in a field in which the distance from the camera to the position expressed as the background is not larger than a predetermined distance (for example, a middle distance), the background texture may be updated in correspondence with the movement of the camera (for example, when the moving amount of the camera becomes not less than a predetermined value).

In this manner, in this step, the server CPU 201 specifies the background texture used for rendering of the background object in the PC 100 in accordance with the rendering camera parameters. More specifically, the server CPU 201 refers to a background texture determination table stored in, for example, the server recording medium 206, and acquires information of a background texture according to the camera parameters. The background texture determination table is, for example, as shown in FIG. 8.

Figures 8, 9:
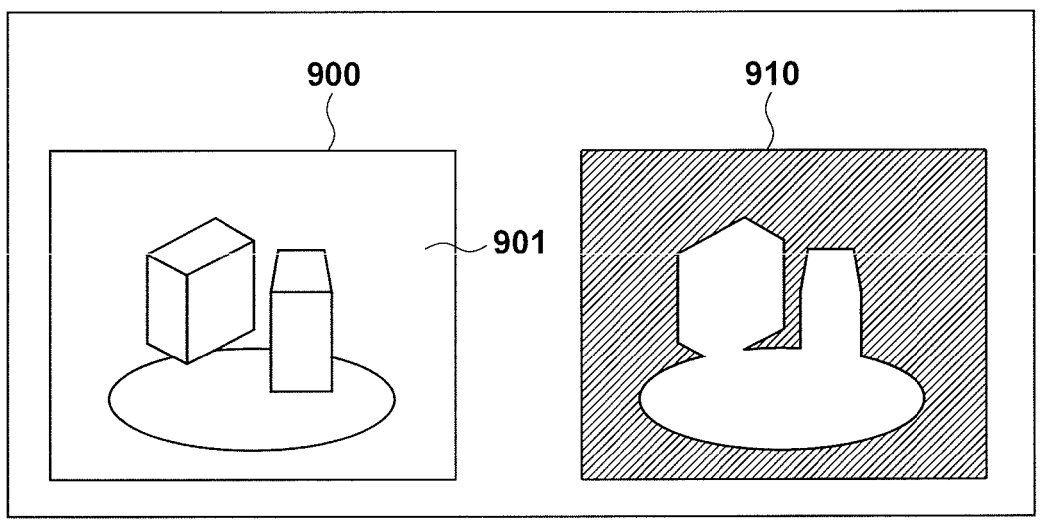
FIG. 8 is a table for determining background texture according to the embodiment of the present invention.
FIG. 9 is a view for explaining mask data generated for a second screen according to the embodiment of the present invention.

As shown in FIG. 8, the background texture determination table stores the following parameters:
 a texture ID;
 a field where the camera is located;
 a content-based time zone; and
 a texture storage location.

The server CPU 201 reads out the rendering camera parameters stored in the server RAM 203, and specifies a field including the camera according to information of the camera position. The server CPU 201 refers to the current content-based time zone, and specifies a background texture used for rendering of the background object in the PC 100 from the background texture determination table.

Note that the following description of this embodiment will be given under the assumption that the rendered contents of the background object are changed by changing only the background texture for the sake of simplicity. However, a change in distance from the camera to the position expressed as the background can be expressed without changing the background texture. For example, a distance change between the background and camera can be expressed by changing the radius of the celestial sphere model to which the background texture is applied. More specifically, in order to express an access to the background, the radius of the celestial sphere model is increased to enlarge an image of the background included in the screen to be rendered.

In step S404, the server CPU 201 transmits the background texture specified in step S403, the celestial sphere model as the three-dimensional model to which the background texture is applied, and the rendering camera parameters to the PC 100. More specifically, the server CPU 201 reads out these pieces of information from the server RAM 203 or server recording medium 206, transfers them to the server communication unit 207, and controls the server communication unit 207 to transmit these pieces of information to the PC 100.

Note that the background texture of the game screen to be rendered does not change when the camera position, of the rendering camera parameters, is located within a predetermined field, as described above. Hence, only the rendering camera parameters may be transmitted in this step. That is, the background texture and celestial sphere model need not be transmitted for each frame. For example, the background texture and celestial sphere model may be transmitted when the camera position moves into a field where the background texture is to be changed, or when a change amount of the camera position is not less than a predetermined amount. Alternatively, the background texture and celestial sphere model may be transmitted at a predetermined frame interval.

In step S405, the server CPU 201 performs server-side rendering processing for generating the second screen on which foreground objects other than the background object of the rendering objects included in the game screen are rendered according to the rendering camera parameters stored in the server RAM 203.

Server-Side Rendering Processing

Figure 5:
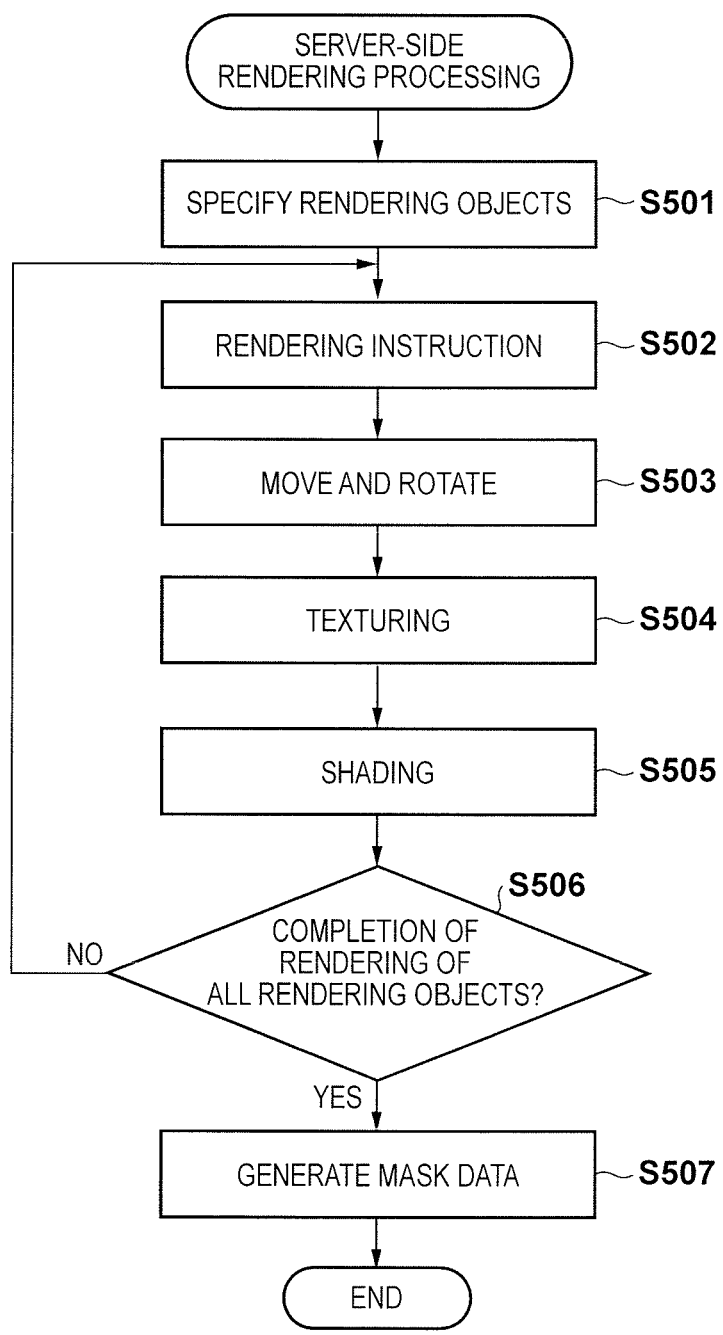
FIG. 5 is a flowchart exemplifying server-side rendering processing performed by the rendering server 200 according to the embodiment of the present invention.

The server-side rendering processing executed by the rendering server 200 of this embodiment will be described in detail below with reference to the flowchart shown in FIG. 5.

In step S501, the server CPU 201 specifies rendering objects (foreground objects) included in the game screen to be rendered. More specifically, the server CPU 201 reads out the rendering camera parameters from the server RAM 203, and refers to information of a rendering range on a world, which is defined by the rendering camera parameters. Then, the server CPU 201 specifies rendering objects included in the rendering range based on, for example, information of layout positions, rendering objects distributed on the world.

Note that the layout positions of the rendering objects distributed on the world may be changed for each frame depending on a time change, such as a moving instruction of the character to be operated at the PC 100. That is, assume that the server CPU 201 updates information of the layout positions of the rendering objects for each frame, and then specifies rendering objects included in the game screen in this step.

In step S502, the server CPU 201 selects a rendering object to be rendered according to a rendering order determined by a predefined rendering order determination method. Then, the server CPU 201 transfers a rendering instruction about that rendering object to the server GPU 204. Also, the server CPU 201 reads out model data (or vertex data and wire connection data) of the rendering object, texture data, light source data in the game screen, and position/rotation information parameters of the rendering object from the server recording medium 206, and transfers them to the server GPU 204.

In step S503, the server GPU 204 moves and rotates the model data stored in the GPU memory according to the position/rotation information parameters of the selected rendering object under the control of the server CPU 201. More specifically, the server GPU 204 defines spatial coordinates corresponding to the position/rotation information parameters for respective vertices of the selected rendering object.

In step S504, the server GPU 204 applies texture mapping to respective polygons of the model data, which has been moved and rotated in step S503, using the texture data stored in the GPU memory under the control of the server CPU 201.

In step S505, the server GPU 204 applies shading processing, which considers the light source data, to the model of the rendering object, which has applied the texture mapping in step S504, and renders that model on a frame buffer of the server VRAM 205 under the control of the server CPU 201.

The server CPU 201 determines in step S506 whether or not rendering of all foreground objects included in the rendering range by the server GPU 204 onto the server VRAM 205 is complete. If the server CPU 201 determines that rendering of all the rendering objects onto the server VRAM 205 is complete, the server CPU 201 proceeds the process to step S507; otherwise, the server CPU 201 returns the process to step S502.

In step S507, the server GPU 204 generates mask data corresponding to the generated second screen under the control of the server CPU 201. More specifically, as shown in FIG. 9, since no background object is rendered on a second screen 900 which is rendered on the server VRAM 205 by the aforementioned processes until step S506, pixels in the screen include pixels 901 which are not rendered. In this embodiment, the game screen to be finally displayed on the display device in the PC 100 is generated by compositing the first screen obtained by rendering the background object and the second screen when the PC 100 performs screen generation processing (to be described later). In this case, the foreground objects rendered on the second screen are overlaid on the first screen on which the background object is rendered.

For this reason, in this embodiment, the rendering server 200 generates and transmits, to the PC 100, mask data 910 of the second screen, as shown in FIG. 9, in order to notify the PC 100 of pixels on which no foreground objects are rendered on the second screen. In the mask data, pixel values indicate opacity values (alpha values) of the second image for composition. For example, a pixel value of each pixel is normalized to a range of 0 to 1. That is, pixel values at positions of the pixels 901, at which any foreground object is not rendered in the rendering processing of the foreground objects, are "0". And pixel values at positions of pixels 902, at which any foreground object is rendered, are "1". Note that when the foreground objects include a translucent object, the mask data can be generated with reference to alpha values set for respective pixels.

In this way, performing the server-side rendering processing of this embodiment, the rendering server 200 generates the second screen, on which the foreground objects, excepting the background object from the rendering objects included in the game screen to be provided to the PC 100, are rendered. Although depending on game contents to be provided, it is generally required, for rendering objects which are rendered as foreground objects, performing heavy computation load processing such as movement or rotation processing of model data, and application of texturing and shading, as described above. By performing these rendering processes of the foreground objects on the rendering server 200, the rendering system of this embodiment attains load balancing of the rendering processes between the PC 100 and the rendering server 200.

Upon completion of generation of the mask data, the server CPU 201 ends the server-side rendering processing, and returns the process to the game processing.

In step S406, the server CPU 201 transmits the second screen and the mask data corresponding to the second screen to the PC 100. More specifically, the server CPU 201 reads out the second screen and the mask data from the server VRAM 205, transfers them to the server communication unit 207, and controls the server communication unit 207 to transmit the second screen and the mask data to the PC 100. After transmission, the server CPU 201 ends the game processing associated with the current frame.

Screen Generation Processing

Figure 6:
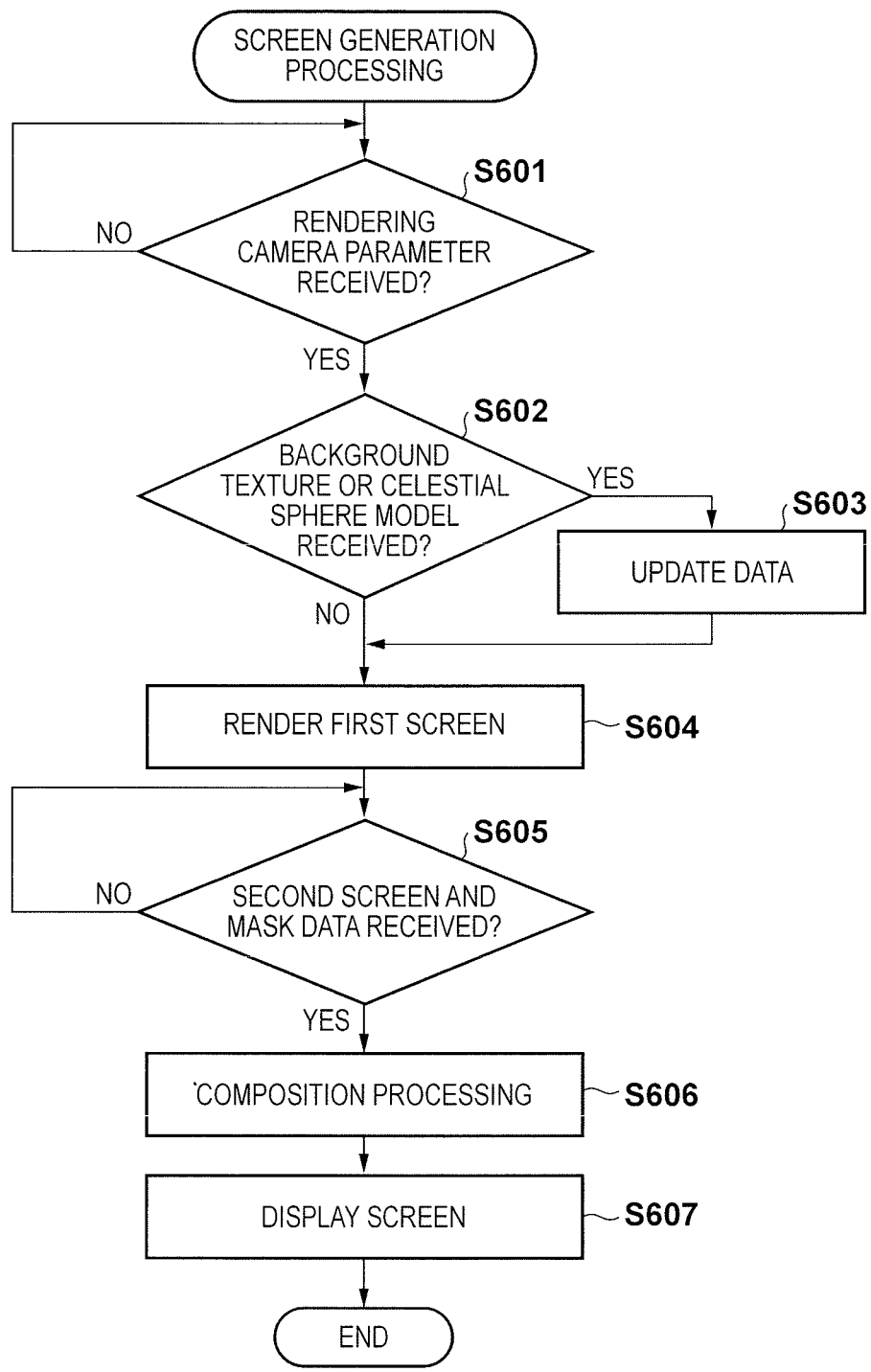
FIG. 6 is a flowchart exemplifying screen generation processing performed by the PC 100 according to the embodiment of the present invention.

The screen generation processing for generating the game screen, which processing is performed by the PC 100 of this embodiment, will be practically described below with reference to the flowchart shown in FIG. 6. The processing corresponding to this flowchart can be implemented when the CPU 101 reads out a corresponding processing program recorded in, for example, the recording medium 106, extracts the readout program onto the RAM 103, and executes the extracted program. Note that the following description will be given under the assumption that this screen generation processing is started when the user inputs an execution instruction of an application corresponding to the game content provided by the rendering server 200 at the PC 100.

The CPU 101 determines in step S601 whether or not the rendering camera parameters, which are used to generate the first screen to be rendered (a screen on which the background object is rendered) and correspond to information required to determine the rendered contents, are received from the rendering server 200. More specifically, the CPU 101 determines whether or not the communication unit 107 receives the rendering camera parameters of the current frame from the rendering server 200. If the CPU 101 determines that the rendering camera parameters are received, it stores the rendering camera parameters in the RAM 103, and then proceeds the process to step S602. On the other hand, if the CPU 101 determines that the rendering camera parameters are not received, it repeats the process of this step.

The CPU 101 determines in step S602 whether or not at least one of the background texture and celestial sphere model is received together with the rendering camera parameters. If the CPU 101 determines that at least one of the background texture and celestial sphere model is received, it proceeds the process to step S603; otherwise, it proceeds the process to step S604.

In step S603, the CPU 101 updates, using at least one of the newly received background texture and celestial sphere model, the already received corresponding data stored in the RAM 103, and stores the updated data.

In step S604, the CPU 101 renders the first screen using the rendering camera parameters, background texture, and celestial sphere model stored in the RAM 103. More specifically, the CPU 101 reads out the celestial sphere model and background texture from the RAM 103, and transfers them to the GPU 104. The GPU 104 applies the background texture to the celestial sphere model, and renders a range included in the screen on the VRAM 105 as the first screen according to the rendering camera parameters.

The CPU 101 determines in step S605 whether or not the second screen and the mask data of the second screen are received from the rendering server 200. If the CPU 101 determines that the second screen and mask data are received, it stores the data in the RAM 103, and then proceeds the process to step S606. If the CPU 101 determines that the second screen and mask data are not received, it repeats the process of this step.

In step S606, the CPU 101 composites the first and second screens to generate a final game screen to be displayed on the display unit 108 on, for example, the VRAM 105. More specifically, the CPU 101 reads out the data of the second screen and the mask data from the RAM 103, and transfers them to the GPU 104. Then, for example, the GPU 104 generates the game screen by overlaying the second screen on the first screen on the VRAM 105 with reference to the mask data.

In step S607, the CPU 101 transfers the final game screen generated in step S606 to the display unit 108, and controls the display unit 108 to display it on the display screen.

As described above, the rendering system of this embodiment can generate the game screen while dividing the rendering processing of the game screen into that of the first screen on which only a background object is rendered and that of the second screen on which rendering objects other than the background object are rendered. That is, in the rendering processing, the game screen can be separately generated the second screen for which complicated three-dimensional models and illuminating calculations, requiring high rendering performance, is required, and the first screen on which a background texture is applied to a simple three-dimensional model. That is, in the rendering processing, generation of the second screen, for which high rendering performance is required, is assigned to the rendering server, thus providing a high-quality game screen independently of the rendering performance of the client device.

Note that this embodiment has explained that rendering process of the game screen is divided and performed between the PC 100 and the rendering server 200 in units of rendering objects depending on whether or not the rendering object is a background object. However, the present invention is not limited to such specific embodiment. The present invention is applicable to a rendering system which can generate a game screen by dividing and performing rendering process of the game screen in units of rendering objects which are included in the game screen, and by compositing a plurality of obtained screens by simple composition processing.

When rendering objects included in a game screen are classified depending on whether or not a rendering object is a background object like in this embodiment, the background object does not influence hidden-surface processing in rendering processing of foreground objects. That is, since all rendering objects of the foreground objects exist in front of the background object, the rendering processing of the foreground object need not consider any occlusion caused by the depth ordering with the background object. For this reason, the first screen obtained by rendering the background object and the second screen obtained by rendering the foreground objects maintain the depth ordering for the rendering objects to be rendered. That is, by simply overlaying the two screens, a game screen equivalent to that obtained when all rendering objects are rendered at the same time can be generated.

On the other hand, for example, when a rendering object included in the second screen is located at a position closer to the camera than that included in the first screen, depth values of respective pixels have to be considered to composite the first and second screens. That is, since depth values of respective pixels are required to be compared upon generation of the game screen, a processing time required for screen composition processing in the PC 100 is unwantedly prolonged. In the rendering system of this embodiment, rendering objects included in the game screen are classified depending on whether or not a rendering object is a background object upon performing the rendering processing, so as to also aim at a computation amount reduction in such composition processing.

As described above, the present invention is applicable to a case in which rendering objects included in a game screen are classified and rendered so that the rendering processing of the first screen does not consider any hidden-surface processing of rendering objects included in the second screen. That is, the present invention is not limited to a background object, and is applicable to a case in which rendering objects are classified according to distances to the camera so as not to require any hidden-surface processing, and screens obtained when a plurality of devices respectively render the classified rendering objects are composited to generate one screen. In this case, the number of rendering objects to be classified may be increased/decreased depending on the rendering processing capability of a device having a GPU of low rendering performance.

As described above, the rendering system of the present invention can efficiently perform rendering processing for one screen while dividing the rendering processing between a plurality of devices. More specifically, the rendering system performs the rendering processing of a screen to be displayed while dividing that processing between a first device and a second device. The first device generates a first screen, on which some of rendering objects to be rendered on the screen are rendered, based on information for determining the rendered contents of the screen to be displayed. The second device generates a second screen, on which rendering objects, excepting the some rendering objects from the rendering objects to be rendered on the screen to be displayed, are rendered. The first device receives the second screen from the second device, and composites the first and second screens, thereby generating the screen to be displayed.

As described above, since the rendering processing for one screen can be separately performed by a plurality of devices in units of rendering objects, a game screen with stable quality can be provided independently of rendering performance of a client device.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A rendering system which divides and performs rendering processing of a screen to be displayed on a display between a first device and a second device,
   the first device comprising:
   a first renderer which is able to generate a first screen, on which rendering objects, which are classified as a first type, among rendering objects to be rendered on the screen to be displayed are rendered, based on information for determining rendered contents of the screen to be displayed;
   a screen receiver which is able to receive a second screen which is generated by the second device and on which rendering objects, except the first type of rendering objects from the rendering objects to be rendered on the screen to be displayed and which are classified as a second type, are rendered; and
   a compositor which is able to generate the screen to be displayed by compositing the first screen generated by the first renderer and the second screen received by the screen receiver, and
   the second device comprising:
   a second renderer which is able to generate the second screen based on the information for determining the rendered contents; and
   a screen transmitter which is able to transmit the second screen generated by the second renderer to the first device, wherein rendering any hidden-surface processing based on the first type of rendering objects is not required for the second type of rendering objects.

2. The system according to claim 1, wherein the second renderer performs rendering processing regardless of the rendering result of the first renderer.

3. The system according to claim 1, wherein the second renderer generates mask data for the second type of rendering objects, together with the second screen,
   the screen transmitter transmits the second screen and the mask data to the first device, and
   the compositor overlays the second screen on the first screen with reference to the mask data.

4. The system according to claim 1, wherein the second device further comprises:
   an acquirer which is able to acquire the information for determining the rendered contents; and
   a transmitter which is able to transmit the information for determining the rendered contents acquired by the acquirer to the first device,
   wherein the first renderer generates the first screen based on the information for determining the rendered contents received from the second device.

5. The system according to claim 1, wherein the first type of rendering objects is a background object on the screen to be displayed.

6. The system according to claim 5, wherein the second device further comprises a parts transmitter which is able to transmit texture data of the background object to the first device based on the information for determining the rendered contents, and
   wherein the first renderer renders the first screen using the texture data of the background object received from the second device and model data of the background object.

7. The system according to claim 6, wherein the model data of the background object is a celestial sphere model.

8. The system according to claim 6, wherein the parts transmitter transmits the texture data of the background object when the information for determining the rendered contents satisfies a predetermined condition.

9. The system according to claim 1, wherein the information for determining the rendered contents is information indicating a position and a direction of a camera, which defines the screen to be displayed.

10. A rendering server for rendering rendering objects, which are classified as a second type, among rendering objects to be rendered on a screen to be displayed on a display connected to a client device, the server comprising:
   a renderer which is able to generate a providing screen on which the second type of rendering objects are rendered based on information required to determine rendered contents of the screen to be displayed; and
   a transmitter which is able to transmit the providing screen generated the renderer to the client device,
   wherein:
the rendering objects to be rendered on the screen to be displayed includes rendering objects which are classified as a first type different from the second type,
   rendering processing for the first type of rendering objects is performed on the client device, and
   rendering any hidden-surface processing based on the first type of rendering objects is not required for the second type of rendering objects.

11. The server according to claim 10, wherein the renderer performs rendering processing regardless of the rendering result of the rendering processing for the first type of rendering objects.

12. The server according to claim 10, wherein the renderer generates mask data for the second type of rendering objects together with the providing screen, and
   the transmitter transmits the providing screen and the mask data to the client device.

13. The server according to claim 10, further comprising:
   an acquirer which is able to acquire the information for determining the rendered contents; and
   an information transmitter which is able to transmit the information for determining the rendered contents acquired by the acquirer to the client device.

14. The server according to claim 10, wherein the first type of objects are rendering objects excepting a background object from the rendering objects to be rendered on the screen to be displayed.

15. The server according to claim 14, further comprising a parts transmitter which is able to transmit texture data of the background object to the client device based on the information for determining the rendered contents.

16. The server according to claim 15, wherein the parts transmitter transmits the texture data of the background object when the information for determining the rendered contents satisfies a predetermined condition.

17. The server according to claim 10, wherein the information for determining the rendered contents is information indicating a position and a direction of a camera, which defines the screen to be displayed.

18. A non-transitory computer-readable recording medium recording a program for controlling a computer to function as the rendering server of claim 10.

19. A control method of a rendering server for rendering rendering objects, which are classified as a second type, among rendering objects to be rendered on a screen to be displayed on a display connected to a client device, the method comprising:
   generating a providing screen on which the second type of rendering objects are rendered based on information required to determine rendered contents of the screen to be displayed; and
   transmitting the generated providing screen to the client device, wherein: the rendering objects to be rendered on the screen to be displayed includes rendering objects which are classified as a first type different from the second type,
rendering processing for the first type of rendering objects is performed on the client device, and
   rendering any hidden-surface processing based on the first type of rendering objects is not required for the second type of rendering objects.

20. A non-transitory computer-readable recording medium recording a program for controlling a computer, to which a display is connected, to function as:
   a renderer which is able to generate a first screen on which rendering objects, which are classified as a first type, among rendering objects included in a screen to be displayed on the display are rendered based on information required to determine rendered contents of the screen to be displayed;
   a receiver which is able to receive a second screen which is generated by an external device and on which rendering objects, which are excepting the first type of rendering objects from the rendering objects to be rendered on the screen to be displayed and which are classified as a second type, are rendered;
   a compositor which is able to composite the first screen generated by the renderer and the second screen received by the receiver to generate the screen to be displayed; and
   a presenter which is able to display the screen to be displayed generated by the compositor on the display, wherein rendering any hidden-surface processing based on the first type of rendering objects is not required for the second type of rendering objects.

* * * * *

UNITED STATES PATENT AND TRADEMARK OFFICE
CERTIFICATE OF CORRECTION

PATENT NO. : 9,717,988 B2
APPLICATION NO. : 14/355914
DATED : August 1, 2017
INVENTOR(S) : T. Iwasaki Page 1 of 1

It is certified that error appears in the above-identified patent and that said Letters Patent is hereby corrected as shown below:

Column 15, Line 16 (Claim 10, Line 10) please change "generated the" to -- generated to the --

Signed and Sealed this
Twenty-third Day of January, 2018

Joseph Matal
*Performing the Functions and Duties of the
Under Secretary of Commerce for Intellectual Property and
Director of the United States Patent and Trademark Office*